Z. MILLER.
Clover Separators.

No. 152,668. Patented June 30, 1874.

UNITED STATES PATENT OFFICE.

ZEPHANIAH MILLER, OF CANAL FULTON, OHIO.

IMPROVEMENT IN CLOVER-SEPARATORS.

Specification forming part of Letters Patent No. 152,668, dated June 30, 1874; application filed April 18, 1873.

*To all whom it may concern:*

Be it known that I, ZEPHANIAH MILLER, of Canal Fulton, in the county of Stark and State of Ohio, have invented certain new and useful Improvements in Clover-Separators; and that the following is a full, clear, and exact specification thereof, which will enable others skilled in the art to make and use the said invention.

The invention relates to improvements in a combined clover-huller and thrashing-machine, as hereinafter described, and specifically stated in the claim.

Figure 1:
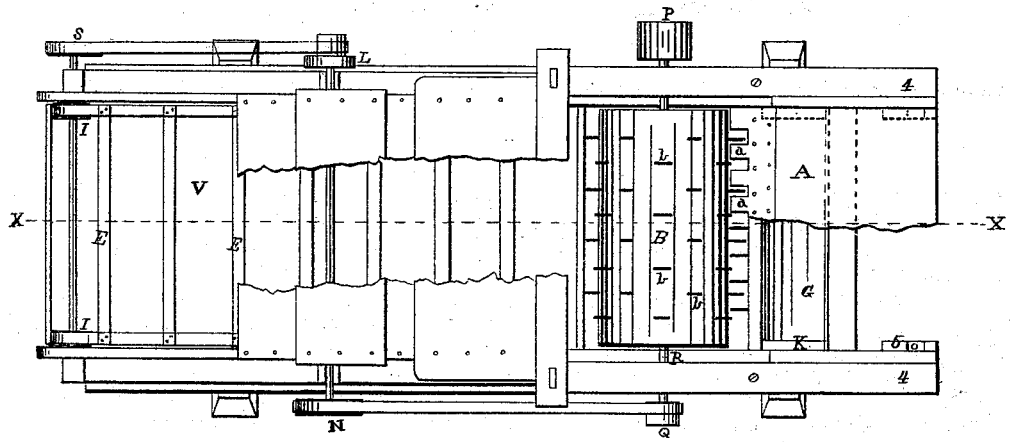
Figure 2:
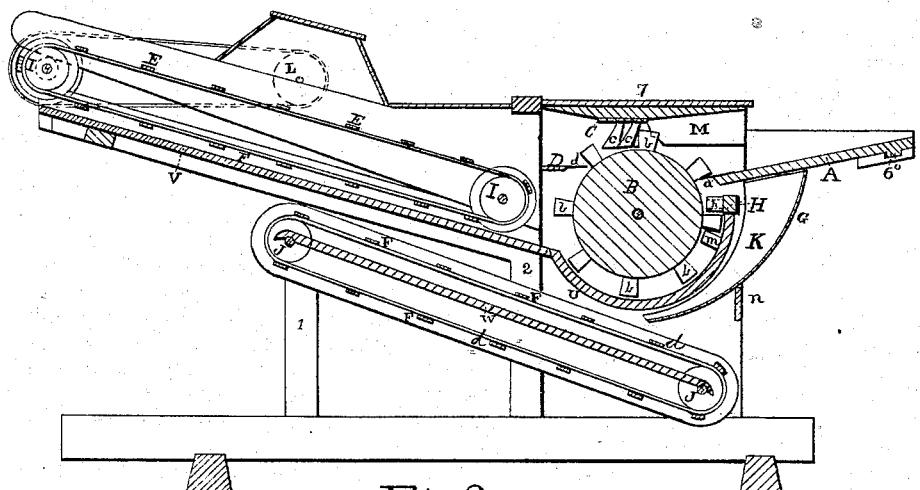
Figure 3:
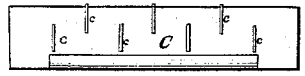
Figure 3:
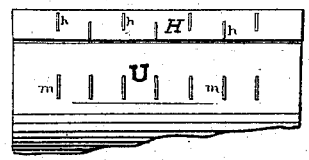

In the accompanying drawing, Figure 1 is a plan of a separator, showing my invention with the winnowing mechanism removed, the cylinder-cover and a portion of the slatted-belt cover and feeding-apron being removed to show the interior construction. Fig. 2 is a transverse section of my invention through the line $x\ x$ in Fig. 1. Figs. 3 are plans of the stemming and hulling concaves.

B is a beater-cylinder, mounted on the shaft R, which is journaled in boxes on cross-pieces of the frame, and having teeth $b$ so arranged as to act with the teeth $c$ of the stemmer-concave C, to tear the stems from the heads of the clover, and to act with the teeth $m$ and $h$ of the huller-concave, to thrash the seed from the pod. C is a stemmer-concave built in the top of the cylinder-cap 7, and having teeth or spikes $c$, of ordinary form, arranged relatively as shown in Figs. 3, with which the teeth $b$ of cylinder B act, to stem the clover-heads from the straw, and between which they freely pass after performing that operation. D is a stationary toothed conducting-apron, lying parallel to the axis of the cylinder B, and secured at its ends to the side pieces of the cylinder-cap 7, and having broad teeth $d$ so arranged with reference to the cylinder B and the endless apron E as to allow the teeth of said cylinder to pass freely between them, and at the same time serving to prevent any straw or pods from falling through into the cylinder-case U. The upper part of the cylinder-case U, with its teeth $m$, and the huller-bar H, with its teeth $h$, are the parts which form the huller-concave, the cylinder-case U being secured in the usual manner, and the huller-bar H being secured at its ends to the side pieces of the cylinder-cap 7, as is the stationary toothed apron D. The teeth $m$ and $h$ of this huller-concave are so arranged with reference to the teeth $b$ of the cylinder B as to secure, by the revolutions of the said cylinder, the thrashing of the seeds from the clover-pods. G is a pod and seed conveyer, constructed with side pieces K, and resting on the cross-piece $n$ of the frame, and so arranged with reference to the cylinder-case U, huller-teeth $m$ and $h$, and separating-apron F as to conduct the pods and seeds coming from the said cylinder-case, and through the teeth $m$ and $h$, over the bar H, onto the separating-apron F. A is a stationary toothed feeding-apron, resting at its inner end on the side pieces K of the conveyer G, and at its outer end on the projections 5 of the main frame 4, being prevented from sliding forward onto the cylinder B by the bearings of the ends of an under brace, 6, in the notches $o$. $a$ are the teeth of the aforesaid stationary toothed feeding-apron, similar in size to the teeth $d$ of the stationary conducting-apron D, and so arranged with reference to the teeth $b$ of the cylinder B as to allow the teeth $b$ of said cylinder to pass freely between, and at the same time to prevent any of the pods and seeds coming from the huller-concave H from being carried through onto the upper part of the cylinder.

In operating this machine, the clover is thrown onto the stationary toothed feeding-apron A, whence it is carried on and over the cylinder B to the teeth $c$ of the stemmer concave C, when the stems are torn from the heads, and both are carried onto the stationary conducting-apron D, and then onto the separator E, the broad teeth $d$ of the apron D preventing any stems or pods from falling into the cylinder-case U. The feed-bottom V catches the heads which have fallen through between the slats of the separating-belt E, whence they are carried by the slats of said belt into the cylinder-case U, and then by the teeth $b$ of the cylinder B to the hulling-teeth $m$ and $h$, by which the seeds are thrashed from the heads, when both are thrown over into the seed and pod conveyer G, falling thence onto the seed separator F, being prevented from rising on the cylinder above the stationary toothed apron A by its broad teeth $d$. Thus the two operations—that of stemming and hulling clover—are performed by one beater-cylinder, where heretofore two cylinders have been used, and are performed in a simpler and more thorough manner, and with greater economy of material and parts, and consequently involving less cost of construction, maintenance, and power, than the clover-thrashers previously used. The pods and seeds pass from the conveyer G to the platform and belt W F, by which they are delivered to the winnowing mechanism located under the platform V; but as this winnowing mechanism forms no part of this invention, it is not here shown or described.

What I claim as new, and desire to secure by Letters Patent, is—

The combination of the toothed beater-cylinder B, stemmer C, toothed stationary plate or apron D, and endless traveling apron E, all as shown and described.

In evidence of the foregoing specification, witness my hand this 9th day of April, A. D. 1873.

ZEPHANIAH MILLER.

Witnesses:
 HENRY J. BREECE,
 CHARLES W. BREECE.